June 26, 1962  J. R. SOLUM  3,040,405
COMPRESSION TYPE STOP COLLAR
Filed Oct. 13, 1958

INVENTOR.
JAMES R. SOLUM
BY Lyon & Lyon
ATTORNEYS

United States Patent Office 3,040,405
Patented June 26, 1962

3,040,405
COMPRESSION TYPE STOP COLLAR
James R. Solum, Los Angeles, Calif., assignor, by mesne assignments, to B & W, Incorporated, Torrance, Calif., a corporation of California
Filed Oct. 13, 1958, Ser. No. 766,961
7 Claims. (Cl. 24—263)

This invention relates to apparatus used in connection with pipe or casing of the type employed in wells. This invention is particularly directed to improvements in a stop collar assembly adapted to be mounted on the outer surface of a well pipe, in order to limit axial movement of devices mounted on the outer surface of the pipe. For example, such devices may comprise scratchers or centralizers of the type commonly mounted on well casing.

It is desirable to avoid welding on alloy steel well pipe under field conditions and accordingly it is desirable to employ means other than welding for anchoring a stop collar solidly on the outer surface of the pipe. The problem is complicated by the fact that well pipe sections of the same nominal size vary considerably in actual outside diameter, within the mill tolerances. Furthermore, the radial dimensions of the stop collar assembly must be held to a minimum in order to avoid restricting the annular space between the well pipe and the wall of the hole.

In accordance with my invention, I provide a stop collar assembly which meets these requirements and which does not require welding for anchoring it in position on the outer surface of a well pipe. I provide a split ring which is tapered on its outer surface and which is encircled by a continuous annular sleeve or band. The annular sleeve or band is expanded over the split ring and the tension in the sleeve caused by such expansion transmits a normal force through the split ring to hold it under compression against the outer surface of the pipe. The annular sleeve or band is installed on the split ring in axial direction by means of a suitable power-operated tool. An adhesive coating on the engaging surfaces of the annular sleeve and split ring prevents axial separation of the parts.

Other and more detailed objects and advantages of the invention will appear hereinafter.

Figure 1:
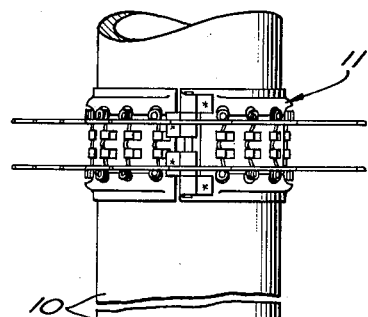
FIGURE 1 is a side elevation partly broken away, showing a preferred embodiment of the invention.
Figure 2:
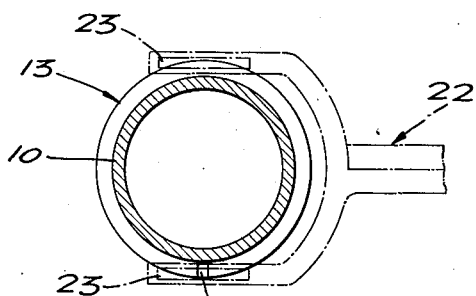
FIGURE 2 is a sectional plan view taken substantially on the lines 2—2 as shown in FIGURE 1.

Referring to the drawings, the well pipe or casing 10 extends into a well bore, not shown, and may be provided with scratcher devices or centralizers or both. The scratcher devices shown at 11 and 12 in FIGURE 1 are loosely mounted to turn on the pipe 10 and may be of any suitable or desirable construction.

A stop collar assembly generally designated 13 is installed on the outer surface of the pipe 10 to limit axial travel of the scratcher devices 11 and 12. A plurality of these stop collar assemblies 13 may be employed but since they are duplicates, only one need be described. The stop collar assembly 13 includes a split ring 14 having a tapered outer surface 15 which converges toward the lower end 16. A radially projecting shoulder 17 is provided on the split ring 14 at a location remote from the end 16. A continuous substantially cylindrical annular sleeve or band 18 of substantially uniform wall thickness encircles the pipe 10 and the inner diameter 19 thereof is initially smaller than the diameter of exterior substantially cylindrical surface 20 of the split ring 14 between the large end of the taper 15 and the radially projecting shoulder 17. The split ring 14 and the annular sleeve or band 18 may both be constructed of steel. The split ring 14 however, has greater hardness and strength than the annular sleeve or band 18, which is preferably in a soft annealed condition. The bore 21 of the split ring 14 is serrated to prevent slipping on the outer surface of the pipe 10. The thickness of the sleeve or band 18 is constant and is smaller than the wall thickness of the pipe 10 in order that the sleeve or band may stretch before imposing damaging compressive stresses in the pipe.

Figure 3:
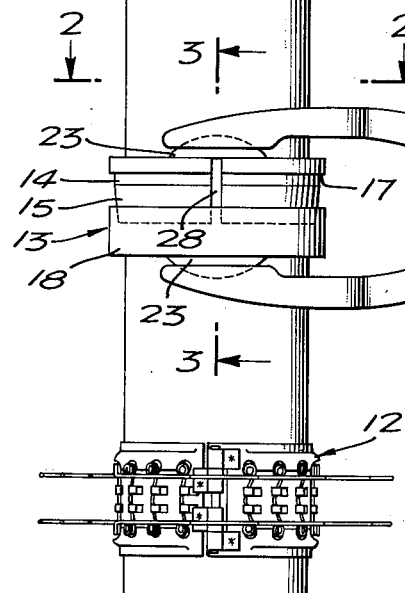
FIGURE 3 is a sectional elevation taken substantially on the lines 3—3 as shown in FIGURE 1.
Figure 3:
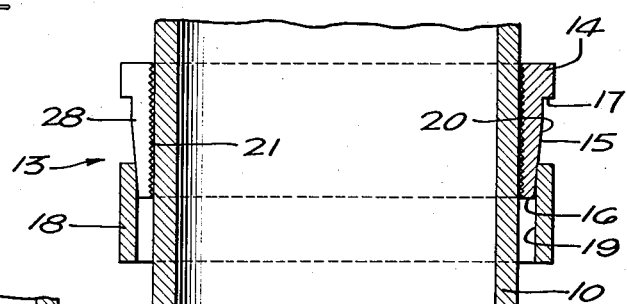
Figure 4:
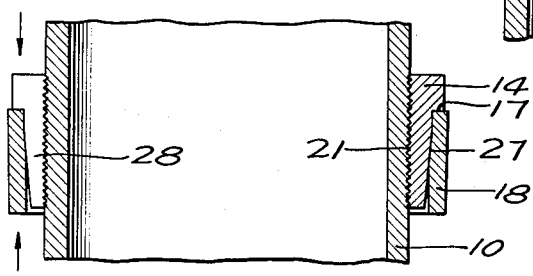
FIGURE 4 is a sectional elevation similar to FIGURE 3 showing the collar parts in assembled position.

In the initial unstressed condition, the parts 14 and 18 are placed on the pipe 10 at the desired location and the upper end of the annular sleeve or band 18 encircles the lower end 16 of the split ring 14. A suitable power-operated tool, such as that shown diagrammatically at 22 in FIGURE 1, is then employed to cause relative axial movement of the parts 14 and 18 from the initial position shown in FIGURE 3 to the final position shown in FIGURE 4. The tool shown at 22 may comprise a pair of tongs having self-aligning inserts 23 which engage the diametrically opposed locations on the split ring 14 and the annular sleeve 18. A power cylinder assembly 24 swings the tong parts about the pivot 25 to develop the necessary axial thrust to cause the sleeve 18 to be expanded over the tapered surface 15 on the split ring 14 and to bring the sleeve 18 into engagement with the shoulder 17. In this expanded condition the inside diameter 19 of sleeve 18 engages and conforms to the exterior cylindrical surface 20 of the split ring 14.

Prior to the assembly operation employing the tool 22 an adhesive coating may be applied to one or the other or both of the engaging surfaces 27. This adhesive coating may comprise a galling compound such as micronized mica or Carborundum dust or any epoxy type cement. A suitable cement material identified as No. 9901 and marketed by Industrial Poly-chemical Service of Gardena, California has been found to be very satisfactory. The cement is very strong, especially in thin layers, and effectively prevents axial separation of the parts 14 and 18 from the position shown in FIGURE 4. When an adhesive coating is not used in the assembly operation the possibility of axial separation of parts 14 and 18 is minimized by engagement of cylindrical surface 20 with band 18 thereby eliminating axial forces induced by tapered surface 15 promoting axial separation.

The width of the groove or slot 28 in the split ring 14 is great enough to prevent contraction of the split ring 14 into solid sealing engagement with well pipe having an outer diameter on the extreme low side of the tolerance, and the initial diameter 19 of the bore of the sleeve 18 is small enough to cause the material of the sleeve 18 to be stressed to a substantial degree while contacting the split ring 14 into position on such minimum-size well pipe. When the outside diameter of the well pipe is on the high side of the tolerance, the annular sleeve or band 18 is stretched beyond the yield point during the installation operation, but the residual hoop tension stress at the elastic limit of the material remains substantially the same. Accordingly, a very substantial contracting force is applied to the split ring 14 by the band 18 regardless of variations in outside diameter of the pipe, within the mill tolerances. The contracting force is sufficient to cause the serrated surface 21 to become at least partially imbedded in the outer surface of the pipe 10.

Having fully described my invention, it is to be understood that I do not wish to be limited to the details herein set forth, but my invention is of the full scope of the appended claims.

I claim:

1. In a stop collar asembly for a well pipe, the combination of: a split ring having an inner surface prepared for contact with the outer surface of the well pipe, the split ring having a tapered outer surface converging toward one end of the split ring, a cylindrical outer surface adjacent the large end of the tapered surface, a radially projecting shoulder adjacent the said cylindrical outer surface, and a continuous annular sleeve having a central opening of a diameter slightly less than the diameter of said cylindrical outer surface and adapted to receive the small end of the tapered surface on said split ring, the annular sleeve having a substantially constant thickness substantially smaller than the wall thickness of the well pipe, the annular sleeve being adapted to be telescoped axially over the tapered outer surface onto the cylindrical outer surface of the split ring into engagement with said shoulder to expand the annular sleeve and to contract the split ring into engagement with the outer surface of the pipe.

2. The combination of claim 1 in which the split ring and the annular sleeve are both formed of metal and wherein the split ring is relatively hard and the annular sleeve is relatively soft.

3. In a stop collar assembly for a well pipe, the combination of: a split ring having a serrated inner surface for contact with the outer surface of the well pipe, the split ring having a tapered outer surface converging toward one end of the split ring a cylindrical outer surface adjacent the large end of the tapered surface, a radially projecting shoulder adjacent the said cylindrical outer surface, a continuous annular sleeve having a central opening of a diameter slightly less than the diameter of said cylindrical outer surface and adapted to receive the small end of the tapered surface on said split ring, the annular sleeve having a substantially constant thickness substantially smaller than the wall thickness of the well pipe, the annular sleeve being adapted to be telescoped axially over the tapered outer surface onto the cylindrical outer surface of the split ring into engagement with said shoulder to expand the annular sleeve and contact the split ring into engagement with the outer surface of the pipe, and an adhesive coating interposed between the contacting parts of the split ring and annular sleeve acting to prevent axial separation thereof.

4. In a stop collar assembly for a well pipe, the combination of: a split ring having a serrated inner surface for engagement with the outer surface of the well pipe, the split ring having an outer surface provided with a taper converging toward one end of the split ring and a cylindrical surface adjacent the large end at said taper, a radially projecting shoulder adjacent the end of said cylindrical surface remote from said taper, a continuous annular sleeve having a central opening of a diameter slightly less than the diameter of said cylindrical surface and adapted to receive the small end of the tapered surface on said split ring, the annular sleeve having a substantially constant thickness substantially smaller than the wall thickness of the well pipe, the annular sleeve being adapted to be telescoped axially over the tapered outer surface onto the cylindrical outer surface of the split ring into engagement with said shoulder to cause the serrated inner surface of the split ring to engage the outer surface of the pipe, and an adhesive coating interposed between the contacting parts of the split ring and annular sleeve acting to prevent axial separation thereof.

5. In a stop collar assembly for a well pipe, the combination of: a split ring formed of metal and having a serrated inner surface for contact with the outer surface of the well pipe, the split ring having an outer surface provided with a taper converging to a small end at one end of the split ring and a cylindrical surface adjacent the large end of said taper, and a continuous annular sleeve formed of metal and having a central opening of a diameter slightly less than the diameter of said cylindrical surface and adapted to receive the small end of the tapered surface on said split ring, the annular sleeve having a substantially constant thickness substantially smaller than the wall thickness of the well pipe, the annular sleeve being adapted to be telescoped axially over the tapered outer surface onto the cylindrical outer surface of the split ring to expand the annular sleeve beyond the yield point of the metal thereof and to contract the split ring into engagement with the outer surface of the pipe.

6. In a stop collar assembly for a well pipe, the combination of: a split ring formed of metal and having a serrated inner surface for contact with the outer surface of the well pipe, the split ring having an outer surface provided with a taper converging to a small end at one end of the split ring and a cylindrical surface adjacent the large end of said taper, a continuous annular sleeve formed of metal and having a central opening of a diameter slightly less than the diameter of said cylindrical surface and adapted to receive the small end of the tapered surface on said split ring, the annular sleeve having a substantially constant thickness substantially smaller than the wall thickness of the well pipe, the annular sleeve being adapted to be telescoped axially over the tapered outer surface onto the cylindrical outer surface of the split ring to expand the annular sleeve beyond the yield point of the metal thereof and to contract the split ring into engagement with the outer surface of the pipe, and an adhesive coating interposed between the contacting parts of the split ring and annular sleeve acting to prevent axial separation thereof.

7. In a stop collar assembly for a well pipe, the combination of: a split ring having an inner surface for engagement with the outer surface of the well pipe, the split ring having an outer surface provided with a taper converging toward one end of the split ring, a second outer surface on the split ring adjacent the large end of said taper, a radially projecting shoulder adjacent said second outer surface and remote from said one end of the split ring, the diameter of the intersection of said second outer surface with the shoulder being not materially greater than the diameter of the intersection of said second outer surface with the taper, a continuous metallic annular sleeve having a central cylindrical opening of a diameter slightly less than the diameter of said second outer surface and adapted to receive the small end of the tapered surface on said split ring, the annular sleeve having a substantially constant thickness substantially smaller than the wall thickness of the well pipe, the annular sleeve being adapted to be telescoped axially over the tapered outer surface onto the said second outer surface of the split ring into engagement with the said shoulder to expand the annular sleeve beyond the yield point of the metal thereof and to contract the split ring into engagement with the outer surface of the pipe.

References Cited in the file of this patent

UNITED STATES PATENTS

| Re. 20,074 | Stahl | Aug. 18, 1936 |
| 327,627 | Webb | Oct. 6, 1885 |
| 329,727 | Gale | Nov. 3, 1885 |
| 1,606,188 | Selah | Nov. 9, 1926 |
| 1,797,194 | Knapp | Mar. 17, 1931 |
| 1,899,531 | Seifner | Feb. 28, 1933 |
| 2,718,266 | Berry et al. | Sept. 20, 1955 |
| 2,824,613 | Baker et al. | Feb. 25, 1958 |

FOREIGN PATENTS

| 1,115,104 | France | Dec. 26, 1955 |
| 842,437 | Germany | June 26, 1952 |
| 163,340 | Great Britain | June 16, 1921 |
| 357,794 | Italy | Mar. 28, 1938 |